(12) United States Patent
Smith et al.

(10) Patent No.: US 8,246,891 B2
(45) Date of Patent: Aug. 21, 2012

(54) SYSTEM AND METHOD FOR MANUFACTURING FATTY ACID BASED MATERIAL PRODUCTS WITH AN INJECTION MOLDING PROCESS

(75) Inventors: Terry Alan Smith, Aurora, OR (US);
Edward Francis Burress, West Linn, OR (US)

(73) Assignee: Xerox Corporation, Norwalk, CT (US)

( * ) Notice: Subject to any disclaimer, the term of this patent is extended or adjusted under 35 U.S.C. 154(b) by 119 days.

(21) Appl. No.: 12/236,431

(22) Filed: Sep. 23, 2008

(65) Prior Publication Data

US 2010/0075008 A1 Mar. 25, 2010

Related U.S. Application Data

(63) Continuation of application No. 12/235,174, filed on Sep. 22, 2008, now Pat. No. 8,038,424.

(51) Int. Cl.
*B29B 7/00* (2006.01)
(52) U.S. Cl. .................................. 264/328.1
(58) Field of Classification Search ........... 264/328.1; 425/547
See application file for complete search history.

(56) References Cited

U.S. PATENT DOCUMENTS

| | | |
|---|---|---|
| 2,309,943 A | 2/1943 | Ernst |
| 3,697,204 A | 10/1972 | Kyritsis et al. |
| 4,197,070 A | 4/1980 | Koschmann |
| 4,426,402 A * | 1/1984 | Kaupert ........................ 426/515 |
| 4,501,498 A | 2/1985 | McKelvey |
| 4,889,478 A | 12/1989 | Sato |
| 5,372,852 A | 12/1994 | Titterington et al. |
| 5,409,722 A * | 4/1995 | Binley ........................ 426/515 |
| 5,439,695 A * | 8/1995 | Mackey ........................ 426/516 |
| 5,820,910 A | 10/1998 | Jury |
| 5,902,621 A | 5/1999 | Beckett et al. |
| RE36,937 E | 10/2000 | Mackley |
| 6,149,846 A | 11/2000 | Zerafati-Jahromi et al. |
| 6,391,356 B1 | 5/2002 | Willcocks et al. |
| 6,419,970 B1 | 7/2002 | Willcocks et al. |
| 6,692,668 B2 | 2/2004 | Ogrinc et al. |
| 7,186,762 B2 | 3/2007 | Wong et al. |
| 7,303,387 B2 | 12/2007 | Hutchinson et al. |
| 7,802,880 B2 | 9/2010 | Jones et al. |
| 7,862,324 B2 | 1/2011 | Jones et al. |
| 2004/0166188 A1 | 8/2004 | Uchiyama et al. |
| 2004/0170750 A1* | 9/2004 | Bunick et al. ........... 426/658 |
| 2004/0201657 A1 | 10/2004 | Jones et al. |
| 2005/0113482 A1 | 5/2005 | Wong et al. |
| 2007/0030322 A1 | 2/2007 | Lee et al. |

(Continued)

OTHER PUBLICATIONS

Ewald, Maria Veronica, First Non-final Office Action for U.S. Appl. No. 12/235,174, United States Patent & Trademark Office, mailed Jun. 9, 2010 (13 pages).

(Continued)

*Primary Examiner* — Larry Thrower
(74) *Attorney, Agent, or Firm* — Maginort, Moore & Beck, LLP

(57) ABSTRACT

A method manufactures molded fatty acid based material products by forming a fatty acid based material paste and injecting the paste into a mold having internal cavities. The method includes generating a fatty acid based material paste, injecting a portion of the fatty acid based material paste under pressure into a cooled mold having at least two separable shells that form product cavities, and separating the shells of the cooled mold to release molded fatty acid based material products from the product cavities.

12 Claims, 3 Drawing Sheets

U.S. PATENT DOCUMENTS

2008/0225096 A1   9/2008   Jones et al.
2011/0032318 A1   2/2011   Rodney-Jones et al.

OTHER PUBLICATIONS

Lockman, David M., Response to First Non-final Office Action for U.S. Appl. No. 12/235,174, submitted Aug. 10, 2010 (11 pages).

Ewald, Maria Veronica, Final Office Action for U.S. Appl. No. 12/235,174, United States Patent & Trademark Office, mailed Oct. 27, 2010 (16 pages).

Lockman, David M., Request for Reconsideration after Final Office Action for U.S. Appl. No. 12/235,174, submitted Dec. 23, 2010 (15 pages).

Ewald, Maria Veronica, Second Non-final Office Action for U.S. Appl. No. 12/235,174, United States Patent & Trademark Office, mailed Jan. 10, 2011 (16 pages).

Lockman, David M., Response to Second Non-final Office Action for U.S. Appl. No. 12/235,174, submitted Apr. 11, 2011 (15 pages).

Heitbrink, Jill Lynn, First Non-final Office Action for U.S. Appl. No. 13/207,530, United States Patent & Trademark Office, mailed Jan. 3, 2012 (6 pages).

Lockman, David M., Response to Non-final Office Action for U.S. Appl. No. 13/207,530, submitted Jan. 24, 2012 (10 pages).

\* cited by examiner

SYSTEM AND METHOD FOR MANUFACTURING FATTY ACID BASED MATERIAL PRODUCTS WITH AN INJECTION MOLDING PROCESS

TECHNICAL FIELD

This disclosure relates generally to processing of fatty acid type materials, and, more particularly, to the manufacture of molded fatty acid food products.

BACKGROUND

Molding materials with a base of fatty acid-like properties produces mixed results. Most materials have a significant density difference between their solid state and the liquid state typically injected into molds. Chocolate products, for example, generally are prepared industrially by conching a ground chocolate ingredient mixture paste at a temperature of from about 50 degrees to about 85 degrees C. and by tempering the conched chocolate to provide a fluid, pourable mass. Viscosity considerations require that the fluid tempered chocolate generally be directed immediately to a molding operation for final product preparation. Although cooling can be carried out during tempering, correct tempering procedures generally require that the chocolate have a temperature on the order of from about 27 degrees C. to about 35 degrees C., depending upon the chocolate composition and character. In addition, when using tempered chocolate in a molding operation, temperature control of the mold also is important, and in general, heating and cooling operations are required.

If the mold temperature is less than the temperature of the tempered fluid chocolate being injected into the mold, the chocolate adjacent the mold surface tends to contract at a rate different from the remainder of the chocolate in the mold which, in turn, tends to result in rough product surfaces and/or de-molding problems and/or poor gloss. On the other hand, if the mold is too hot, the chocolate may lose its temper at least partially, which tends to result in poor contraction during cooling and/or in producing a product having a poor surface-finish. Thus, the molding operation generally requires heating a mold to a temperature which substantially corresponds to that of the tempered fluid chocolate.

After filling the mold cavity, the mold is cooled to set the chocolate. Generally, a cooling tunnel assembly or a multi-tier cooler, as known in the art, are used for this cooling. A properly set and glossy product typically requires cooling the mold and chocolate to a temperature on the order of from 10 degrees C. to 20 degrees C. The rate of cooling is also important, not only because of cooling contraction considerations, but also because an at least initial gradual controlled cooling should be employed so that the final product does not exhibit or tend to develop, prematurely, fat bloom. Thus, a cooling cycle time on the order of from about 20 minutes to about 30 minutes is typically required for a properly set product. This time frame limits the amount of production, while the equipment and energy necessary for thermal control increases the expense of product manufacture. Numerous materials other than chocolate, such as cheese, soaps, various candies and confectioneries, as well as intermediate fabrication processes that use wax of various forms, and the like, exhibit similar behaviors and have similar process requirements.

SUMMARY

A method has been developed that enables fatty acid-like material products, such as those made from chocolate, to be formed without requiring the mold to be held at the temperature of the material being injected into the mold and then being cooled thereafter. The method forms a fatty acid based material paste and injects the fatty acid based material paste into a mold having internal cavities that are cooled to a temperature that is less than the fatty acid based material paste being injected into the mold. The method includes generating a fatty acid based material paste, cooling a mold having at least two separable shells that form product cavities to a temperature that is less than the fatty acid based material paste, injecting a portion of the fatty acid based material paste under pressure into the mold, and separating the shells of the mold to release products from the product cavities. The paste may be formed by a variety of techniques, including heating a first quantity of solid fatty acid based material particulates to a temperature at which the fatty acid based material particulates reach a liquid state and then mixing the first quantity of fatty acid based material particulates with a second quantity of fatty acid based material particulates in or near a solid state to form a paste. This paste is suitable for injection into a mold that has been cooled to a temperature that is less than the fatty acid based material paste.

This method of product manufacture may be used with an injection molding machine to form a system for manufacturing molded food products. The system includes an injection molding machine having a barrel in which a heated member is located, the barrel having an outlet. The system also includes a cooling jacket mounted on an exterior of the barrel, a movable member located within the barrel, a heater located within the movable member, an actuator coupled to the movable member, and a controller coupled to the heater, the cooling jacket, and the actuator, the controller being configured to regulate the heater to maintain the movable member within a temperature range in which liquid fatty acid based material remains in a liquid or near liquid state, to operate the cooling jacket to maintain the barrel in a temperature range in which fatty acid based material remains in a solid or near solid state, and to energize the actuator to cause the movable member to mix the liquid or near liquid fatty acid based material proximate the movable member with the solid or near solid fatty acid based material proximate the barrel to form a fatty acid based material paste.

BRIEF DESCRIPTION OF THE DRAWINGS

The foregoing aspects and other features of a molded fatty acid based material product manufacturing system and method are explained in the following description, taken in connection with the accompanying drawings.

DETAILED DESCRIPTION

Figure 1:
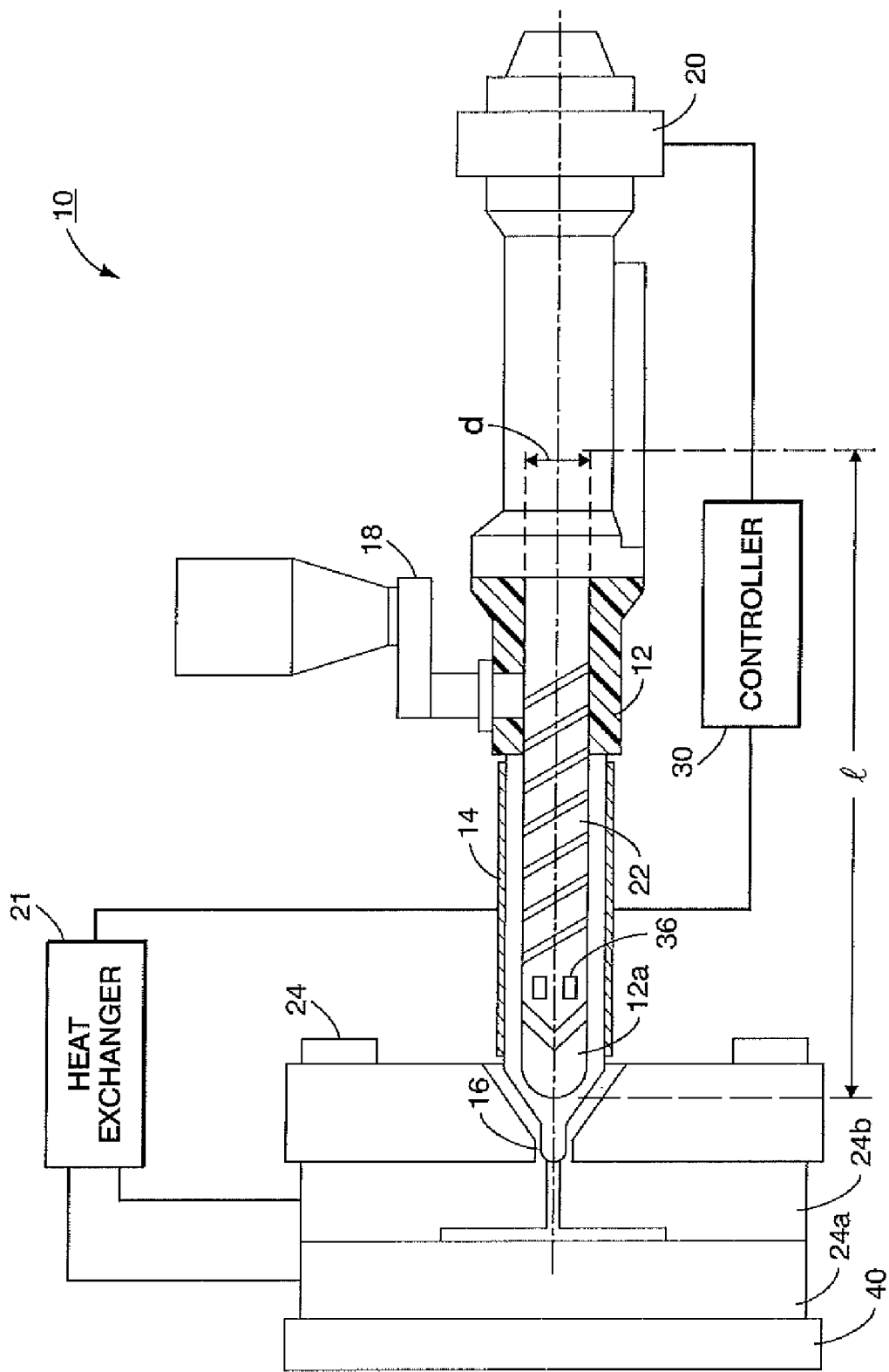
FIG. 1 is a diagram of an injection molding machine in which molded fatty acid based material products may be manufactured.

FIG. 1 depicts an injection molding machine 10 in which the method of manufacturing molded fatty acid based material products, which is described below, may be implemented. The term fatty acid based material is intended to include all fatty acid and similar materials known in the various food, cosmetic, soap, and wax industries. This range of fatty acid based materials is hereafter described with reference to a chocolate or fatty acid food material for simplicity. The custom made injection molding machine 10 has a barrel 12 with a diameter of 80 mm and a length l of approximately 2.5 m. Solid food pieces, such as chocolate buttons, bits, or pastilles, may be supplied to the injection-molding apparatus 10 through a feeder 18. As discussed in more detail below, the paste may be generated elsewhere and then fed to the injection molding machine. If solid food pieces are provided through the feeder 18, the food pieces may be produced by any known technique. The size of the pieces can range from more than 12 mm to about 1 microns. The small size of the pieces provides greater surface area for heating to enable the pieces to respond to heating and cooling quickly. While smaller pieces are desirable for this reason, manufacture, storage, and transport of the pieces may influence the optimal size for the food material used in a particular environment.

A temperature profile of the barrel 12 is maintained by one or more cooling jackets 14, which are grouped into independently controlled zones along the barrel 12, including along a barrel head 12a and a nozzle portion 16. The cooling jackets include fluid passageways that enable a coolant to flow through the jacket. The coolant absorbs heat from the barrel and the warmed fluid is passed through a heat exchanger 44 to remove the heat from the fluid. The fluid may then be recirculated through the jacket to continue the cooling of the barrel. The fluid may be, for example, an oil or an ethylene glycol. A rotary actuator or drive 20 turns a retractable screw 22 within the barrel 12. The screw 22 is also hollow to enable heaters (not shown) to be placed within the screw. Selective activation of the heaters controls the temperature of the screw. In one injection molding machine, the screw 22 has a diameter of 25 mm.

The heaters or other thermal controlling elements within the screw 22 and the cooling jackets 14 are coupled to a controller 30. The controller is a processor and related input/output circuitry with volatile and non-volatile memory. Programmed instructions are stored in a portion of the memory for execution by the processor to control the injection molding process. These instructions may be programmed in a known manner to configure the controller to monitor the temperature of the barrel, the screw, and other areas of the machine and to regulate these temperatures by controlling the heaters within the screw and the flow of coolant through the cooling jackets. Additionally, the controller is coupled to the drive 20 to move the screw within the barrel 12 in a programmed manner. Thus, the ability of the machine 10 to form solid products depends upon the configuration of the controller by the programming instructions stored in the memory of the controller. In one envisioned application for food products, the nominal target temperature is in a range of about 27 degrees C. to about 95 degrees C. for the screw and the nominal target temperature is in a range of about 15 degrees C. to about 25 degrees C. for the barrel.

If all of the food pieces within the barrel reach the melting temperature for the food being processed, the fatty food fails to respond to the rotation of the screw to move forward to the nozzle 16 of the barrel 12. On the other hand, if all of the food pieces remain in a solid state, the fatty food fails to achieve sufficient flow characteristics to enable injection of the material from the barrel into a mold coupled to the nozzle 16. To enable the food to acquire a consistency that enables movement within the barrel and injection into the mold, the controller has been configured through programming instructions to heat the screw to a temperature that maintains the food pieces proximate the heated member in a liquid state and to regulate the barrel temperature at a level that keeps the food pieces proximate the barrel in a solid state. The liquid food proximate the screw enables the screw to rotate freely. The screw rotation acts to mix the melted fatty food with the solid fatty food between the screw and the barrel to form a paste. The paste also responds to the rotation of the screw by being moved forward towards the nozzle. A non-return valve 36 prevents the paste from squeezing backwards into the barrel portion 12 during injection. Thus, the controller maintains the screw 22 at a temperature that generates a sufficient amount of melted fatty food to form a paste when mixed with the solid fatty food in the barrel by the rotation of the screw.

As used herein, the term "paste" refers to a material in a state between liquid and solid, which may be described as semi-liquid or semi-solid. These two descriptions, semi-liquid and semi-solid, are synonymous. The liquid state for the material being processed is a state in which the material is pourable and conforms to the shape of a sharp cornered container as the material is poured into the container. The solid state refers to the state in which the material retains a given three dimensional shape having a non-supported square cross-section projection with a length/width ratio of 5 for a time period of 24 hours under uniform environmental conditions. This description can apply to "flaccid" materials, such as cheese, where the initial shape may include droop, but does not increase its droop under the conditions stated above. The width referenced is the widest cross-section acting to resist droop due to gravity and would be uniform over the length of cross-section. Some fatty acid based materials over some portion of the temperature range at which the described paste state exists may also be described as a slurry since a portion of the paste is liquid and another portion of the paste is solid or nearly solid. The reader should appreciate that the waxy nature of such material may undergo a state change from solid to liquid over a wide temperature range that is extended in comparison to other more familiar substances, such as water becoming ice when chilled, steam when heated, or solder transitioning from a nominally malleable solid state to liquid almost immediately after supplying sufficient heat. Different constituents in the fatty food melt at different temperatures so the material is not easily induced into a homogeneous paste state by simply altering its temperature. Therefore, fatty acid food and other fatty acid based materials may appear to be solid when nearly so and liquid when not fully so.

This understanding of material states related to temperature should aid the reader in seeing that churning or mixing fatty food that is liquid with fatty food that is solid results in a temperature change of that fatty food mixture and yield a more uniform paste consistency over a fairly short period of time. The process of producing this paste state can occur by mixing fully liquid material with fully solid material in appropriate proportions based on churning or mixing effectiveness for an adequate time, allowing the cooler mass to warm and the warmer mass to cool. A paste state may also be attained by mixing fatty food that has not fully reached the liquid state with fatty food that is not fully solid, to generate any combination of fully or partially liquid fatty food mixed with fully or nearly fatty food, depending upon the amount of time the two states or near-states are mixed and the effectiveness of the mixing. The mixing or churning of the range of material states is affected by shear tendencies of the different states and these tendencies are affected by temperature and mass of the different material states confined between heated and cooled members or structures of the injection molding machine or press. Holding material at a temperature intermediate the solid and liquid states for an extended period of time may allow the material to become a usable paste, but this method of producing paste may not be practical in high volume production scenarios.

The press barrel 12 is maintained at a temperature that prevents all of the solid fatty food in the barrel from being melted so a paste can be formed. Although the barrel may be described as cooled, this term is used in a relative sense. Thus, the "cooler" temperature of the barrel is defined as being below the fatty food melt temperature so this surface may in fact, at times, be heated and, at other times, be cooled to prevent it from becoming too hot. The rotation of the screw 22 also mechanically transports the paste to the nozzle 16 so the controller can energize the reciprocating actuator and pressurize a portion of the paste to eject a shot of paste from the nozzle 16 into the mold 24. Once the paste shot has been injected, the rotary drive 20 rotates the screw 22 to continue making the paste and to transport a portion of the paste forward to the nozzle. The rotary drive portion 20 is controlled by the controller to transport each shot through the barrel portion 12 in regular cycles at a set velocity to enable the time that each shot spends in the different temperature zones of the barrel 12 to be precisely controlled. This precision enables the consistency of each shot to be reproducibly controlled. A drive or actuator may rotate a screw for mixing and/or feeding fatty food paste or may accomplish those functions with a linear motion, such as reciprocating motion of a screw or a piston, plunger, or ram. Combinations of rotary and linear motion may be used with a screw or ram within a molding machine. An actuator may also move an ejection member that is independent of the barrel and an internal feed device or conveyor, which may be a ram, screw, or some conveyor combination.

The mold 24 is a mold having internal cavities that are coupled together by runners, as known in the art, although other types of molds may be used. As shown in FIG. 1, a clamp 40 moves the two sections 24a, 24b of the mold 24 towards and away from one another. The applied clamp force is dependent on the size and the number of the products to be molded. In one envisioned embodiment, a clamp force of about 25 tons is applied to the mold. The mold also includes an inlet that is configured for mating with the nozzle 16 of the barrel 12. The inlet enables a paste shot ejected from the nozzle to enter the mold to form items within the internal cavities of the mold.

The fatty acid based material paste enters the mold cavities through gates that are fed either by the nozzle of the barrel or, if multiple cavities are within a mold, runners extending from the nozzle. Because the fatty acid based material paste is thicker than materials typically injected into molds and a goal of the process is to prevent fatty acid based material temperatures from elevating excessively, larger than typical gates are desired. Small gates require higher injection forces that increase the velocity and friction of the material as it enters the cavity. These factors heat the material and may attenuate the benefit of injecting fatty acid based material paste into a mold with a paste consistency. Gate size is influenced by the timing of the injection cycle and the volume and shape of the cavity or cavities to be filled. In one envisioned embodiment, the gate size has a diameter of approximately 5 mm.

The mold 24 also includes one or more fluid passageways that are not in fluid communication with the internal cavities. These passageways may be coupled to a cooling system that pumps a coolant through the passageways to remove heat from the mold. The coolant may be an oil or ethylene glycol and the coolant is circulated through a heat exchanger 44 to remove heat from the coolant and renew the ability of the coolant to maintain the temperature of the mold below the liquid state maintaining temperature. Thus, a paste shot entering the mold forms a skin as a portion of the shot contacts a wall of an internal cavity of the mold. The skin helps seal the fatty acid based material product so it is relatively impervious to moisture after the fatty acid based material product is released from the mold. Additionally, the skin is sufficiently thick that the mold may be separated by the controller operating the clamp relatively quickly after the injection of the paste shot into the mold without deformation of the fatty acid based material product. The skin and the amount of paste in a shot are adequate to enable the fatty acid based material internal to the skin to cool without shrinkage or breakage of the skin. In one envisioned embodiment, the mold is maintained within a temperature range of about −5 degrees C. to about 5 degrees C. Depending upon material properties and mold dwell times, this temperature range may extend from about −60 degrees C. to over 20 degrees C. Because moisture in the air may produce ice particles at the lower temperatures, the process is better performed in a relatively dry environment.

Figure 2:
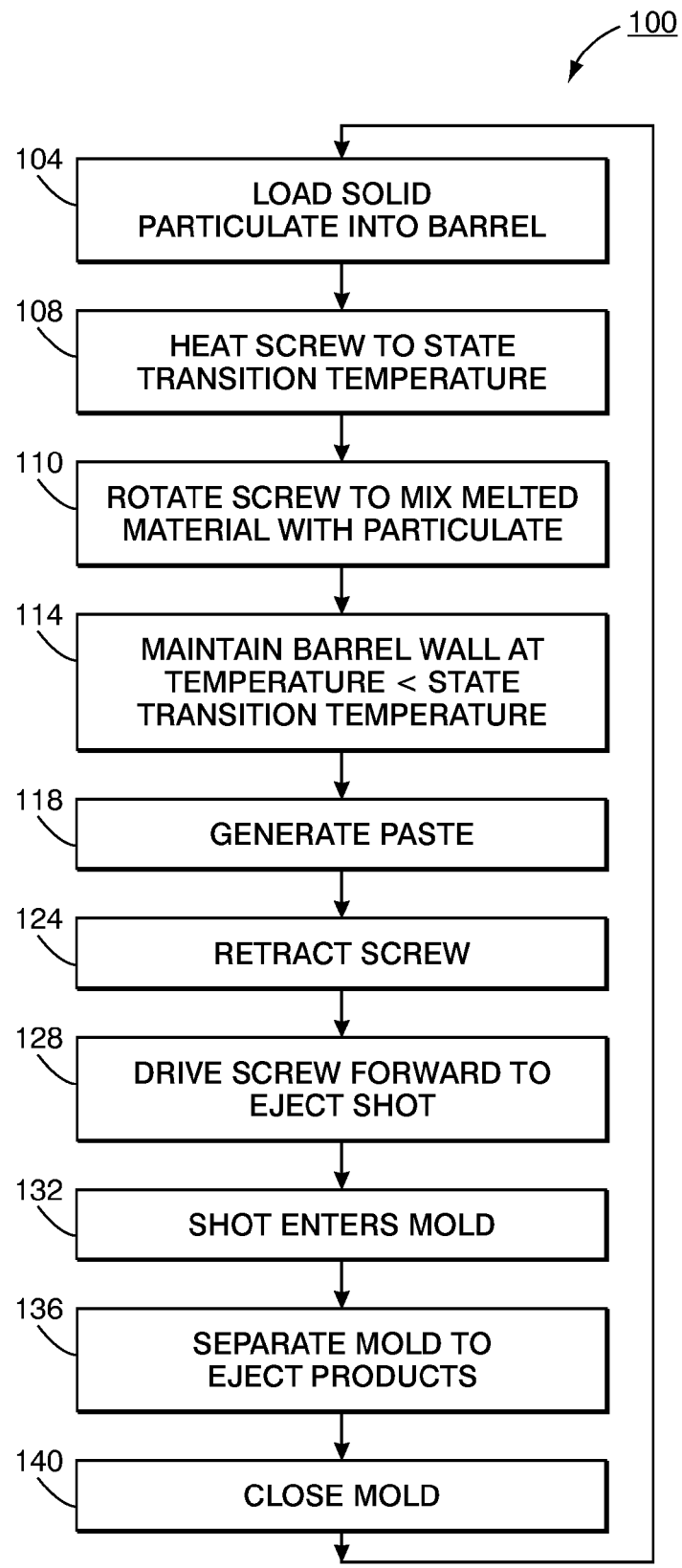
FIG. 2 is a flow diagram of a process that may be implemented by configuring the controller of the machine in FIG. 1 to perform the process.

A method 100 that may be implemented by programmed instructions executed by the controller is shown in FIG. 2. In general, the method generate a paste from solid fatty acid based material, injects a portion of the paste under pressure into a cooled mold having at least two separable shells that form product cavities, and separates the shells of the mold to release molded fatty acid based material products from the product cavities. The injection pressure used in one application was nominally about 5 Bar during the initial and mid-phase of fill and was increased to about 40 Bar to ensure the mold was fully packed at the end of the fill cycle. In one envisioned embodiment, solid fatty food pieces are loaded from a source, such as a hopper of an injection molding machine, into the barrel of the machine (block 104). In other possible embodiments, the fatty acid based material may be melted to form a liquid state. This liquid fatty acid based material may be fed into the injection molding machine. In the injection molding machine, the screw of the machine is heated to a temperature within a range that converts solid fatty acid based material to a liquid or near liquid state or that maintains that state (block 108). Additionally, the wall of the barrel is regulated to a temperature within a range that converts liquid fatty acid based material to a solid or maintains solid fatty acid based material in a solid state (block 110). The screw is rotated to mix the melted fatty food proximate the screw with the solid fatty food proximate the barrel (block 114). The mixing of the melted fatty food and the solid fatty food forms a paste that is transported by the rotating screw to the nozzle of the barrel (block 118). The screw is then retracted to enable a portion of the shot to enter the nozzle (block 124) and then the screw is driven forward to eject a shot of the paste from the nozzle of the barrel (block 128). The shot enters a mold that is cooled to a temperature that enables a portion of the shot that contacts the walls of the internal cavities to form a skin for a food product (block 132). The mold is separated (block 136) to enable the food products to fall from the mold. The mold is then closed (block 140) and the process continues (block 104).

The injection molding machine and method of operation described above requires an injection molding machine to heat and to cool the material within the barrel of the injection molding machine. The cooling is performed by circulating a heat absorbing medium about the barrel to enable the barrel to be maintained in a temperature range that causes the material to exist in a solid state proximate the barrel. The heating is performed by circulating a heated media in the interior of a hollow screw, operating a cartridge heater within the screw, or by regulating current flow in a resistive heater associated with the screw. By providing material in both a solid state and a liquid state within the injection molding machine, a paste can be formed having a consistency that enables the screw to transport the paste forward to an outlet and eject the paste into a cooled mold. The temperature of the mold enables the paste to flow through the gates and passageways of the mold and, upon contact with a wall of an internal cavity, form a skin. This skin provides an exterior for the product with relatively few surface defects. The skin also enables the remaining paste to fill the interior of the skin without voids while maintaining desirable aesthetics. Upon release of the product from the mold, the skin is sufficiently solid that little or no breakage occurs in the ensuing handling or occasional mishandling and the continued cooling is sufficiently uniform that dimples, cracks, and other defects are less likely to form than with other previously known mold methods for ink stick formation.

The injection molding machine and method described above may be used to form solid objects from fatty acid based material materials that are capable of being both liquid and solid. For example, chocolate, taffy-like candies, and cheese can be melted to form a liquid and cooled to form a solid. Consequently, such fatty acid based material products may be fed to an injection molding machine as either a liquid or a solid and treated by the screw and barrel to form a fatty acid based material paste. This paste may then be transported by the screw to the ejection port and shot into a cooled mold for formation of a solid object, such as a chocolate bar or cheese block. Other products, for example, candle wax, soaps, and cosmetics, may also be molded with this method.

In another envisioned embodiment of the injection molding machine useful for manufacturing fatty acid based material objects, the paste may be produced outside of the injection molding machine. The paste may be made, for example, by mixing a predetermined quantity of the material in a solid state with a predetermined quantity of the material in the liquid state to form the paste. The paste may then be pumped or gravity fed into the injection molding machine. The barrel and screw of the injection molding machine are regulated by the controller to remain within a temperature range that keeps liquid material proximate the screw and solid material proximate the barrel. The paste material is transported to the ejection port and shot into the cooled mold as described before.

Figure 3:
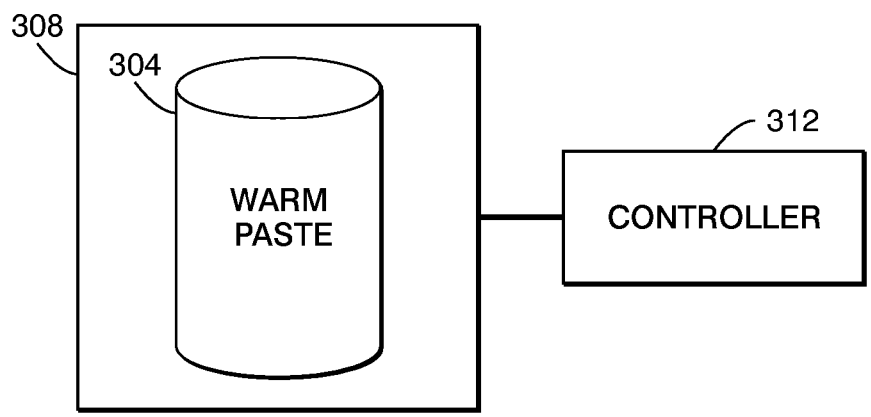
FIG. 3 illustrates an alternative method for manufacturing the paste that is injected into the mold of FIG. 1.
Figure 4:
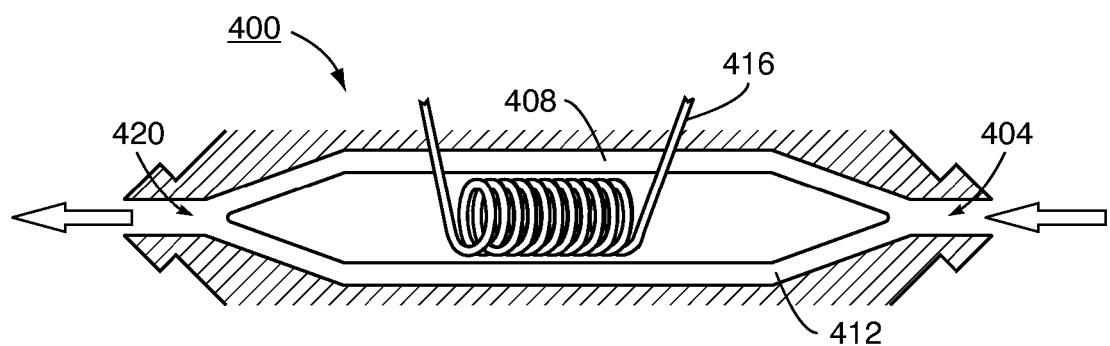
FIG. 4 illustrates another alternative method for manufacturing the paste that is injected into the mold of FIG. 1.

Other methods may be used to obtained material pastes. For example, the described material paste consistency can be attained by a method in which a large mass of material is held in a volumetric container, such as container 304 shown in FIG. 3, which is placed in a heating chamber 308, such as an oven. A controller 312 is coupled to temperature sensors (not shown) in the heating chamber so the controller can regulate the chamber temperature at an appropriate temperature for a sufficient time to obtain uniformity in the paste without melting material in the container. FIG. 4 illustrates another example in which solidified material is forced into inlet 404 of a barrel 400 and urged through constricting passages 408 and 412. The passages are brought to elevated temperatures by a heating element 416 to heat the material. The convergence of the materials before exiting through the outlet 420 mixes the heated flows for formation of the paste. Again, heating element 416 may be coupled to a controller for regulation of the temperature of the passageways.

It will be appreciated that various of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method for manufacturing molded fatty acid based material products comprising:
   generating a fatty acid based material paste having a first temperature;
   the paste generation comprising heating a volume of the fatty acid based material with a heater for a period of time sufficient to bring the fatty acid based material to the first temperature at which paste consistency is established, and limiting the heater to a temperature that does not melt the material;
   injecting a portion of the fatty acid based material paste at the first temperature under pressure into a mold having at least two separable shells that form product cavities with gates that are sized to prevent elevation of the fatty acid based material paste above the first temperature, each shell of the mold having a temperature that is less than the first temperature of the injected fatty acid based material paste, the temperature of the shells enabling the injected fatty acid based material paste to form a skin upon contact with an internal surface of one of the mold shells; and
   separating the shells of the mold to release molded products from the product cavities.

2. The method of claim 1, the fatty acid based material paste generation further comprising:
   moving solid fatty acid based material pieces from an inlet supply in an injection molding machine to a heated conveyor within a barrel;
   melting the solid fatty acid based material pieces with the heated conveyor to generate a liquid proximate the heated conveyor;
   cooling the barrel to enable fatty acid based material proximate the barrel to be at or near a solid state; and
   mixing the solid or near solid state fatty acid based material proximate the barrel with the liquid proximate the heated conveyor to generate the paste.

3. The method of claim 2 wherein the solid fatty acid based material pieces have a diameter in a range of about 12 millimeters to about one micron.

4. The method of claim 2 wherein the heated conveyor is a screw extruder.

5. The method of claim 2 wherein the heated conveyor is a ram injector.

6. The method of claim 1, the paste generation further comprising:
   feeding liquid fatty acid based material into a barrel of an injection molding machine;
   heating a conveyor within the barrel to maintain the liquid fatty acid based material in a liquid state proximate the conveyor;
   cooling the barrel to form solid fatty acid based material proximate the barrel; and mixing the solid fatty acid based material pieces proximate the barrel with the liquid proximate the conveyor to generate the paste.

7. The method of claim 6, the barrel cooling further comprising:
cooling the barrel to a temperature within a range of about 15 degrees C. to about 25 degrees C.

8. The method of claim 6, the conveyor heating further comprising:
heating the conveyor to a temperature within a range of about 27 degrees C. to about 95 degrees C.

9. The method of claim 2 further comprising:
heating the heated conveyor to a temperature within a range of about 27 degrees C. to about 95 degrees C.

10. The method of claim 1 further comprising:
injecting the paste into the mold at a pressure of about 5 Bar to about 40 Bar.

11. The method of claim 1 further comprising:
cooling each shell of the mold to approximately the same temperature that is within a range of about −15 degrees C. to about 15 degrees C.

12. The method of claim 1, the paste generation further comprising:
forcing solid fatty acid based material through a heated passage controlled at a temperature that establishes paste consistency.

* * * * *